United States Patent
Nakajima

(10) Patent No.: US 11,662,738 B2
(45) Date of Patent: May 30, 2023

(54) AUTONOMOUS MOBILE APPARATUS, AUTONOMOUS MOVE METHOD, AND RECORDING MEDIUM THAT USE A SELECTED ENVIRONMENT MAP

(71) Applicant: CASIO COMPUTER CO., LTD., Tokyo (JP)

(72) Inventor: Mitsuyasu Nakajima, Mizuho-machi (JP)

(73) Assignee: CASIO COMPUTER CO., LTD., Tokyo (JP)

(*) Notice: Subject to any disclaimer, the term of this patent is extended or adjusted under 35 U.S.C. 154(b) by 298 days.

(21) Appl. No.: 16/293,271

(22) Filed: Mar. 5, 2019

(65) Prior Publication Data
US 2019/0278289 A1  Sep. 12, 2019

(30) Foreign Application Priority Data
Mar. 9, 2018  (JP) .............................. JP2018-042608

(51) Int. Cl.
*G05D 1/02* (2020.01)
*G05D 1/00* (2006.01)
(Continued)

(52) U.S. Cl.
CPC .......... *G05D 1/0246* (2013.01); *G01C 21/20* (2013.01); *G05D 1/0088* (2013.01);
(Continued)

(58) Field of Classification Search
CPC .. G05D 1/0246; G05D 1/0274; G05D 1/0088; G05D 1/0276; G05D 2201/0203;
(Continued)

(56) References Cited

U.S. PATENT DOCUMENTS

2009/0028387 A1* 1/2009 Jeong ................... G06V 10/141
382/103
2014/0371909 A1* 12/2014 Lee ...................... G05D 1/0246
700/259
(Continued)

FOREIGN PATENT DOCUMENTS

EP          2343615 A1    7/2011
JP       2008-254167 A   10/2008
(Continued)

OTHER PUBLICATIONS

EPO; Application No. 19159546.1; Extended European Search Report dated Jun. 27, 2019.
(Continued)

*Primary Examiner* — Rachid Bendidi
(74) *Attorney, Agent, or Firm* — Fitch, Even, Tabin & Flannery LLP

(57) ABSTRACT

An autonomous mobile apparatus includes a memory and a processor. The processor is configured to acquire environment information that is information of a surrounding environment of the autonomous mobile apparatus, based on the acquired environment information, select, as an estimation environment map, an environment map that is suitable for the surrounding environment from among environment maps that are saved in the memory, and estimate a location of the autonomous mobile apparatus using the selected estimation environment map and an image of surroundings of the autonomous mobile apparatus that is captured by an imager.

15 Claims, 10 Drawing Sheets

(51) Int. Cl.
*G01C 21/20* (2006.01)
*G06V 20/56* (2022.01)

(52) U.S. Cl.
CPC ......... *G05D 1/0274* (2013.01); *G05D 1/0276* (2013.01); *G06V 20/56* (2022.01); *G05D 2201/0203* (2013.01)

(58) Field of Classification Search
CPC ....... G01C 21/20; G06V 20/56; B25J 9/1602; B25J 9/1664; B25J 9/1697; B25J 11/0085
See application file for complete search history.

(56) References Cited

U.S. PATENT DOCUMENTS

| | | | |
|---|---|---|---|
| 2016/0370804 A1* | 12/2016 | Suh | B60L 53/305 |
| 2018/0051990 A1* | 2/2018 | Takeuchi | G01S 17/931 |
| 2018/0225524 A1* | 8/2018 | Fujita | G06T 7/246 |

FOREIGN PATENT DOCUMENTS

| | | | | |
|---|---|---|---|---|
| JP | 2009-176031 A | | 8/2009 | |
| JP | 2010-176203 A | | 8/2010 | |
| JP | 2011-048706 A | | 3/2011 | |
| JP | 2011-209845 A | | 10/2011 | |
| JP | 2014-164374 A | | 9/2014 | |
| JP | 2017-204132 A | | 11/2017 | |
| JP | 2018-28489 A | | 2/2018 | |
| KR | 20070109592 A | * | 11/2007 | |
| RU | 2540058 C2 | * | 1/2015 | ........... B25J 9/0003 |
| WO | 2007113956 A1 | | 10/2007 | |
| WO | 2016016955 A1 | | 2/2016 | |

OTHER PUBLICATIONS

Peter Biber, et al., "Experimental Analysis of Sample-Based Maps for Long-Term SLAM," International Journal of Robotics Research, vol. 28, No. 1, Mar. 17, 2008, pp. 1-27, XP055596807.

JPO; Application No. 2018-042608; Office Action dated Jan. 11, 2022.

* cited by examiner

AUTONOMOUS MOBILE APPARATUS, AUTONOMOUS MOVE METHOD, AND RECORDING MEDIUM THAT USE A SELECTED ENVIRONMENT MAP

CROSS-REFERENCE TO RELATED APPLICATION

This application claims the benefit of Japanese Patent Application No. 2018-042608, filed on Mar. 9, 2018, the entire disclosure of which is incorporated by reference herein.

FIELD

This application relates generally to an autonomous mobile apparatus, an autonomous move method, and a recording medium.

BACKGROUND

Autonomous mobile apparatuses that create an environment map and autonomously moves, such as cleaning robots that automatically clean indoor spaces, have become in wide use. When images that are captured by a camera are used for creating an environment map, the contents of the created environment map are significantly influenced by environment such as the lights. Therefore, if its own location is estimated using an environment map in an environment that is different from such environment as the lights in which the environment map is created, the performance in estimating the location is largely deteriorated. As a technique for solving this problem, International Publication No. 2016/016955 describes an autonomous mobile apparatus that estimates its own location based on the location of a landmark in the surrounding environment so as to enable estimation of its own location that is less influenced by external disturbance.

SUMMARY

The autonomous mobile apparatus of the present disclosure is an autonomous mobile apparatus, including a memory and a processor. The processor is configured to acquire environment information that is information of a surrounding environment of the autonomous mobile apparatus, based on the acquired environment information, select, as an estimation environment map, an environment map that is suitable for the surrounding environment from among environment maps that are saved in a memory, and estimate a location of the autonomous mobile apparatus using the selected estimation environment map and an image of surroundings of the autonomous mobile apparatus that is captured by an imager.

BRIEF DESCRIPTION OF THE DRAWINGS

A more complete understanding of this application can be obtained when the following detailed description is considered in conjunction with the following drawings, in which.

DETAILED DESCRIPTION

The autonomous mobile apparatus according to an embodiment of the present disclosure will be described below with reference to the drawings. Here, in the figures, the same or corresponding parts are referred to by the same reference numbers.

Embodiment 1

The autonomous mobile apparatus according to an embodiment of the present disclosure is an apparatus that autonomously moves according to the purpose of use while creating maps (environment maps). The purpose of use includes, for example, use for security monitoring, for indoor cleaning, for pets, for toys, and the like.

Figure 1:
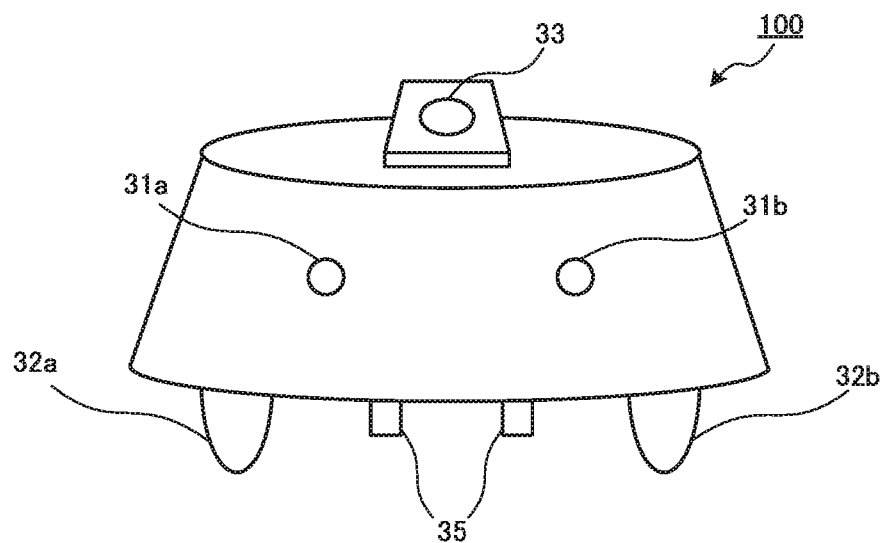
FIG. 1 is an illustration that shows the appearance of the autonomous mobile apparatus according to Embodiment 1 of the present disclosure.
Figure 2:
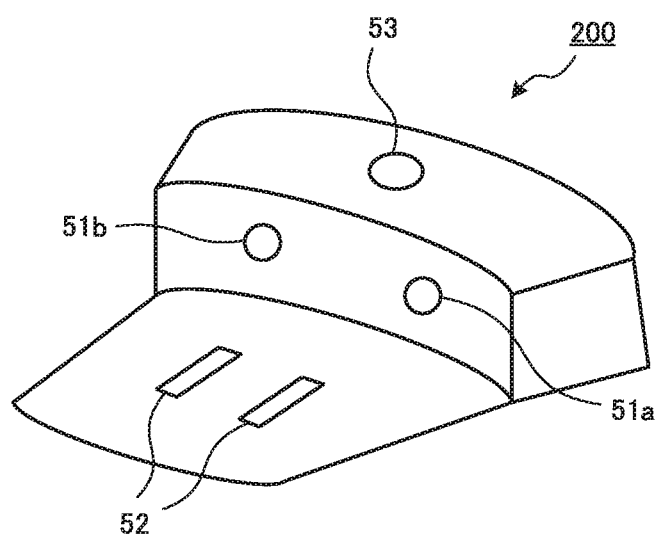
FIG. 2 is an illustration that shows the appearance of the charger according to Embodiment 1.

An autonomous mobile apparatus 100 comprises, as shown in FIG. 1, feedback signal receivers 31 (31a, 31b), drivers 32 (32a, 32b), an imager 33, and charge connectors 35 in appearance. Although not shown in FIG. 1, the autonomous mobile apparatus 100 may comprise an obstacle sensor that detects objects (obstacles) that are present in the surroundings. Moreover, a charger 200 for charging the battery of the autonomous mobile apparatus 100 comprises, as shown in FIG. 2, feedback signal transmitters 51 (51a, 51b), power supplies 52, and a charger's imager 53 in appearance.

As the charge connectors 35 of the autonomous mobile apparatus 100 and the power supplies 52 of the charger 200 are connected, the autonomous mobile apparatus 100 can receive power supply from the charger 200 and charge the built-in battery. Here, the charge connectors 35 and the power supplies 52 are each a connection terminal for connecting each other. The charge connectors 35 and the power supplies 52 are connected as the autonomous mobile apparatus 100 moves onto the charger 200 by means of the drivers 32. The connection may be made as the charge connectors 35 and the power supplies 52 make contact or may be made through electromagnetic induction as the charge connectors 35 and the power supplies 52 come close to each other.

The imager 33 comprises a wide-angle lens that allows for photographing in a wide range between the forward and upward fields of the autonomous mobile apparatus 100. Therefore, the imager 33 can capture an image that makes it possible to determine whether the ceiling light is on. Then, the autonomous mobile apparatus 100 can perform a process of monocular simultaneous localization and mapping (SLAM) using the imager 33.

Although not used in Embodiment 1, the charger's imager 53 also comprises a wide-angle lens that allows for photographing in a wide range around and above the charger 200. Like the imager 33, the charger's imager 53 can also capture an image that makes it possible to determine whether the ceiling light is on.

The feedback signal receivers 31 of the autonomous mobile apparatus 100 are a device for receiving feedback signals (infrared beacons) that are transmitted by the charger 200. A total of two feedback signal receivers 31, a feedback signal receiver 31a to the left and a feedback signal receiver 31b to the right in a front view of the autonomous mobile apparatus 100, are provided. Moreover, the feedback signal transmitters 51 of the charger 200 are a device for transmitting feedback signals to the autonomous mobile apparatus 100. A feedback signal transmitter 51a to the right and a feedback signal transmitter 51b to the left in a front view of the charger 200 are each provided as the feedback signal transmitters 51. Then, feedback signals that are transmitted by the feedback signal transmitter 51a and feedback signals that are transmitted by the feedback signal transmitter 51b are different signals. Therefore, the feedback signal receivers 31 can determine from which of the right and left feedback signal transmitters 51a, 51b the feedback signals are received.

Figure 3:
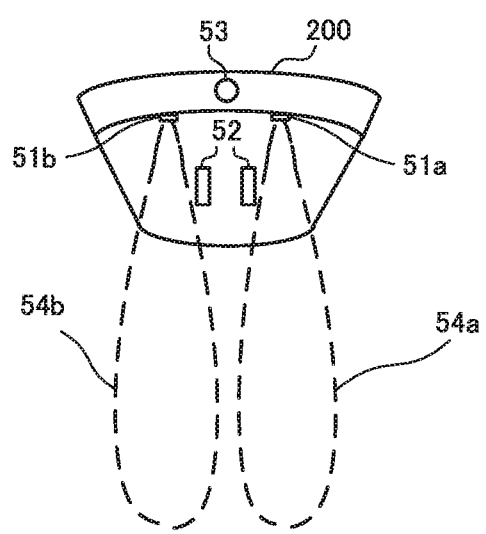
FIG. 3 is an illustration for explaining feedback signals that are transmitted by the charger according to Embodiment 1.

FIG. 3 shows exemplary right and left respective receivable ranges 54 (54a, 54b) of feedback signals that are transmitted by the feedback signal transmitters 51 of the charger 200. Feedback signals that are transmitted by the feedback signal transmitter 51a can be received when the feedback signal receivers 31 of the autonomous mobile apparatus 100 enter the receivable range 54a. Then, feedback signals that are transmitted by the feedback signal transmitter 51b can be received when the feedback signal receivers 31 of the autonomous mobile apparatus 100 enter the receivable range 54b. Therefore, entering the receivable ranges 54, the autonomous mobile apparatus 100 can know the direction in which the charger 200 is present. Then, the autonomous mobile apparatus 100 advances while adjusting the orientation so that the feedback signal receiver 31a receives feedback signals from the feedback signal transmitter 51a and the feedback signal receiver 31b receives feedback signals from the feedback signal transmitter 51b, thereby being able to move onto the charger 200. As the autonomous mobile apparatus 100 moves onto the charger 200, the charge connectors 35 and the power supplies 52 are connected and the battery that is built in the autonomous mobile apparatus 100 can be charged.

The drivers 32 are of an independent two-wheel drive type and moving means that comprises wheels and motors. The autonomous mobile apparatus 100 can parallel-shift (translation) back and forth by driving the two wheels in the same direction, rotate (turn) on the spot by driving the two wheels in opposite directions, and circle (translation+rotation (turn)) by driving the two wheels at different speeds. Moreover, each wheel is provided with a rotary encoder. The amount of translation and the amount of rotation can be calculated by measuring the numbers of rotations of the wheels with the rotary encoders and using geometric relationships of the diameter of the wheels, the distance between the wheels, and the like. For example, assuming that the diameter of a wheel is D and the number of rotations is R (that is measured by the rotary encoder), the amount of translation at the ground contact part of the wheel is $\pi \cdot D \cdot R$. Moreover, assuming that the diameter of a wheel is D, the distance between the wheels is I, the number of rotations of the right wheel is RR, and the number of rotations of the left wheel is RL, the amount of rotation for turning (assuming that the right turn is positive) is $360° \times D \times (RL-RR)/(2 \times I)$. Successively adding the amount of translation and the amount of rotation above, the drivers 32 function as so-called odometry (mechanical odometry) and can measure its own location (the location and the orientation with reference to the location and the orientation at the start of moving).

Figure 4:
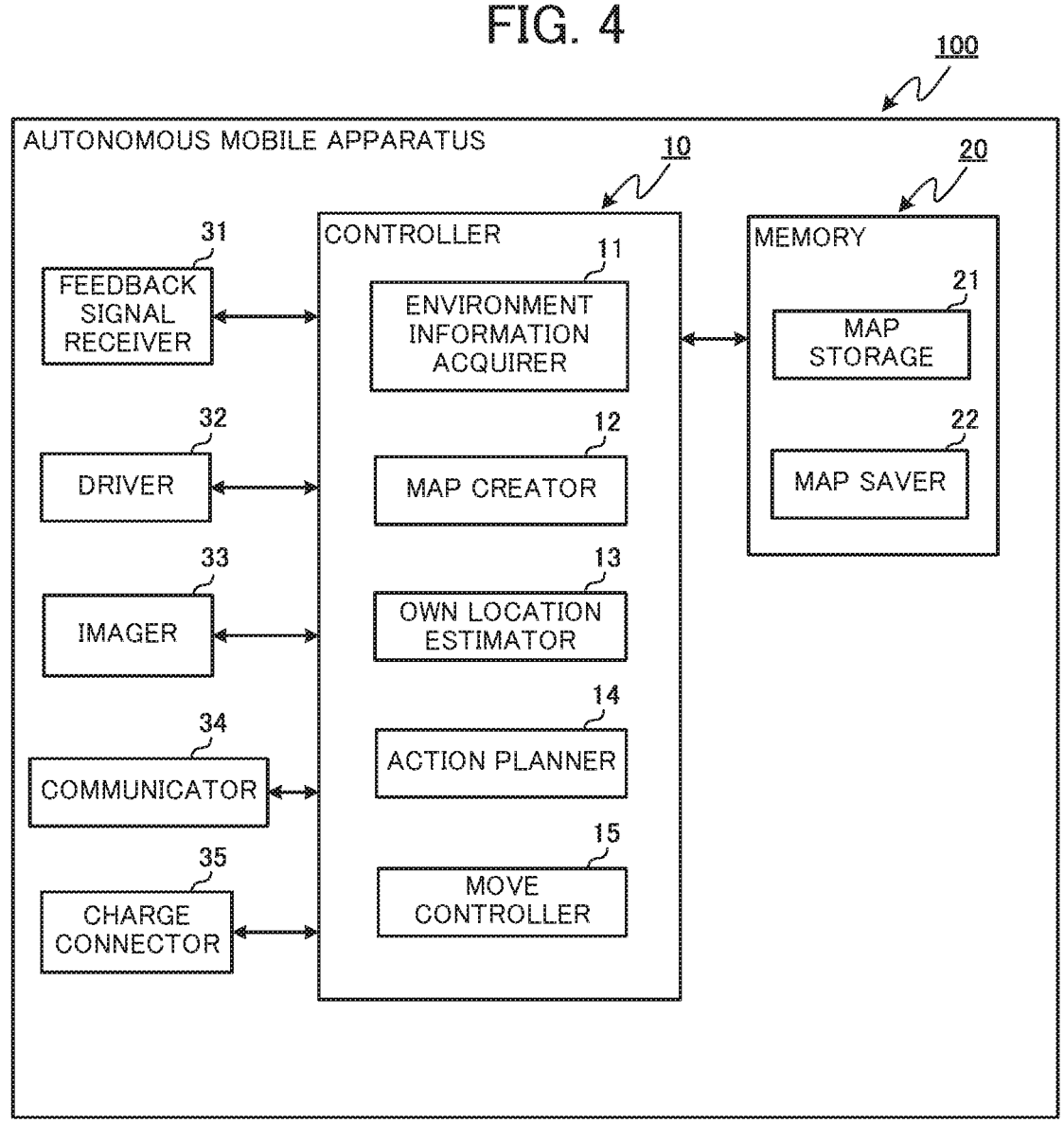
FIG. 4 is a diagram that shows the functional configuration of the autonomous mobile apparatus according to Embodiment 1.

As shown in FIG. 4, the autonomous mobile apparatus 100 comprises, in addition to the feedback signal receivers 31 (31a, 31b), the drivers 32 (32a, 32b), the imager 33, and the charge connectors 35, a controller 10, a memory 20 and a communicator 34.

The controller 10 comprises a central processing unit (CPU) as a processor and the like, and executes programs that are stored in the memory 20 to realize the functions of parts described later (an environment information acquirer 11, a map creator 12, an own location estimator 13, an action planner 14, and a move controller 15). Moreover, comprising a clock (not shown), the controller 10 can acquire the current date/time and measure the elapsed time.

The memory 20 comprises a read only memory (ROM), a random access memory (RAM), and the like. The ROM comprises an electrically rewritable memory (a flash memory or the like) in part or in whole. The memory 20 functionally includes a map storage 21 and a map saver 22. The ROM stores programs that are executed by the CPU of the controller 10 and data that are necessary preliminary to executing the program. The RAM stores data that are created and/or changed while the programs are executed.

Figure 5:
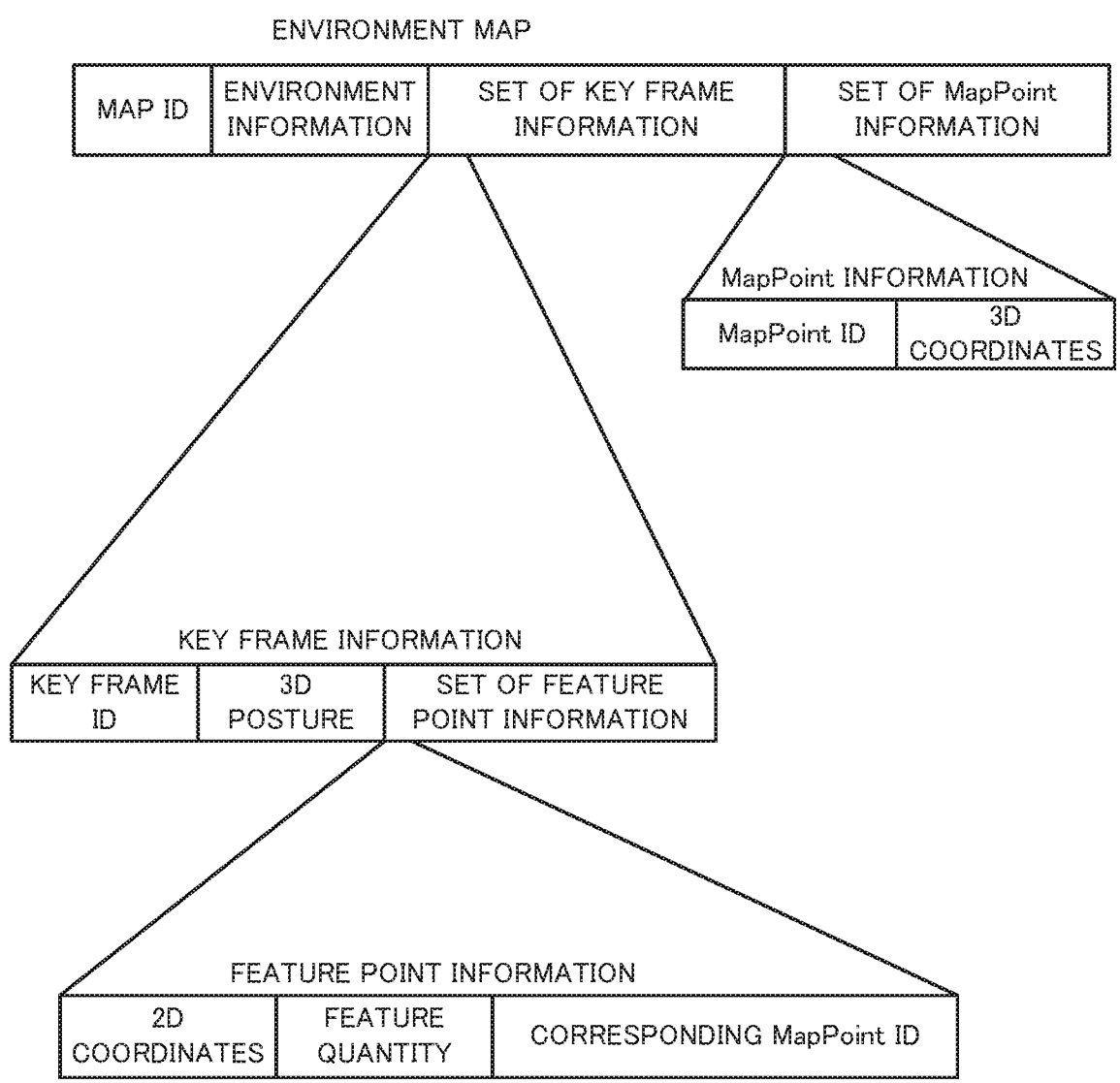
FIG. 5 is a chart that shows the data structure of an environment map that is created by the autonomous mobile apparatus according to Embodiment 1.

The map storage 21 stores an environment map that is created by the map creator 12 through the SLAM based on information of an image that is captured by the imager 33. An environment map includes, as shown in FIG. 5, a set of key frame information and a set of MapPoint information as well as environment information upon acquisition of these sets of information. Each environment map is given a map ID (identifier). The map ID is an ID for uniquely identifying an environment map.

Here, a key frame is a frame that is used in the SLAM for estimating a three-dimensional (3D) location among images (frames) that are captured by the imager 33. Then, as shown in FIG. 5, the key frame information includes a 3D posture (a location (3D coordinates) and an orientation) within an environment map (in a three-dimensional space) of the imager 33 (the autonomous mobile apparatus 100) when the key frame is captured and information of multiple feature points that are included in the key frame. Moreover, each key frame information is given a key frame ID that is an ID for uniquely identifying the key frame.

The feature points that are included in a key frame mean points of featuring parts within an image such as edge parts and corner parts in a key frame (an image). The feature points can be detected using an algorithm, for example scale-invariant feature transform (SIFT), speeded up robust features (SURF), features from accelerated segment test (FAST), and the like. Then, as shown in FIG. 5, information of a feature point includes the 2D coordinates of the feature point within the key frame, a feature quantity of the feature point, and an ID of the MapPoint that corresponds to the feature point when the 3D coordinates of the feature point within the environment map are already estimated. When the 3D coordinates of the feature point within the environment map are not yet estimated, a special ID (for example, 0) that indicates that the 3D coordinates are not estimated is saved in the "CORRESPONDING MapPoint ID."

Here, as a feature quantity of a feature point, for example, a feature of oriented FAST and rotated BRIEF (ORB) can be used. Moreover, the MapPoint means a point of 3D coordinates of a feature point for which the 3D coordinates within the environment map are successfully estimated by the SLAM. The MapPoint information includes, as shown in FIG. 5, a MapPoint ID (an ID for uniquely identifying a MapPoint) and the 3D coordinates of the MapPoint within the environment map. Therefore, the 3D coordinates of a feature point within the environment map can be acquired from the "corresponding MapPoint ID" that is included in the information of the feature point.

Moreover, the environment information is information of surrounding environments that possibly influence estimation of the location of the autonomous mobile apparatus 100 such as the light being ON/OFF, brightness information, and the time. Important environment information is mainly information regarding the brightness (the light being ON/OFF, the curtains being opened/closed, conditions of the sunlight from the windows (morning or evening, weather), and the like) and may include the number of people, the furniture arrangement, and the like. Moreover, although the temperature, the humidity, the atmospheric pressure, and the like do not directly influence estimation of the location, these kinds of information may be included in the environment information if causing some change in the room arrangement and/or people entering/leaving the room.

The map saver 22 is present in the electrically rewritable ROM (such as a flash memory) of the memory 20 and saves the environment map that is stored in the map storage 21 so that the environment map is not erased after the autonomous mobile apparatus 100 is powered off.

The communicator 34 is a wireless module including an antenna for wireless communication with the charger 200 and other external apparatuses. For example, the communicator 34 is a wireless module for short range wireless communication based on Bluetooth (registered trademark). Using the communicator 34, the autonomous mobile apparatus 100 can receive image data that are captured by the charger's imager 53 that is provided to the charger 200 and exchange data with external apparatuses.

Next, the functional configuration of the controller 10 of the autonomous mobile apparatus 100 will be described. The controller 10 realizes the functions of the environment information acquirer 11, the map creator 12, the own location estimator 13, the action planner 14, and the move controller 15 to create environment maps, estimate its own location, control the move, and so on. Moreover, the controller 10 has the capability of multithreading and can execute multiple threads (different process flows) in parallel.

The environment information acquirer 11 acquires environment information that presents the surrounding environment, such as the light being ON/OFF and brightness information, based on image data that are captured by the imager 33. Moreover, when date/time information is included in the environment information, the environment information acquirer 11 acquires the current date/time from the clock that is provided to the controller 10.

The map creator 12 creates environment map data that comprise a set of key frame information and a set of MapPoint information shown in FIG. 5 by the SLAM using the image data that are captured by the imager 33 and writes the data in the map storage 21.

The own location estimator 13 estimates the posture (the location (3D coordinates) and the orientation) of the autonomous mobile apparatus 100 within the environment map by the SLAM using the image data that are captured by the imager 33 and the environment map data that are created by the map creator 12. Here, stating "the posture (the location and the location)" each time is cumbersome and therefore, simply stating "the location" in this specification and the scope of claims means not only the location but also the orientation inclusive. In other words, "the location" is used to express "the posture (the location and the orientation)" in some cases.

The action planner 14 sets a destination and a route based on the environment map that is stored in the map storage 21 and an operation mode. Here, the operation mode determines an action manner of the autonomous mobile apparatus 100. The autonomous mobile apparatus 100 has multiple operation modes, for example "a free walking mode" for randomly moving, "a map creation mode" for expanding the map creation range, and "a destination specification mode" for moving to a place that is specified by the main thread that is described later or the like. Conditions for shifting the operation mode may be preset; for example, the operation mode is initially the map creation mode and shifted to the free walking mode when a map is created to some extent (for example, after 10 minutes of the map creation mode) and then to the destination specification mode in which the destination is specified to the location of the charger 200 when the remaining battery level is low. Alternatively, the operation mode may be set by an order from an external source (the user, the main thread, or the like). When the action planner 14 sets a route, the action planner 14 sets a route from the current location of the autonomous mobile apparatus 100 to a destination based on an environment map that is created by the map creator 12.

The move controller 15 controls the drivers 32 to move the autonomous mobile apparatus 100 along the route that is set by the action planner 14.

Figure 6:
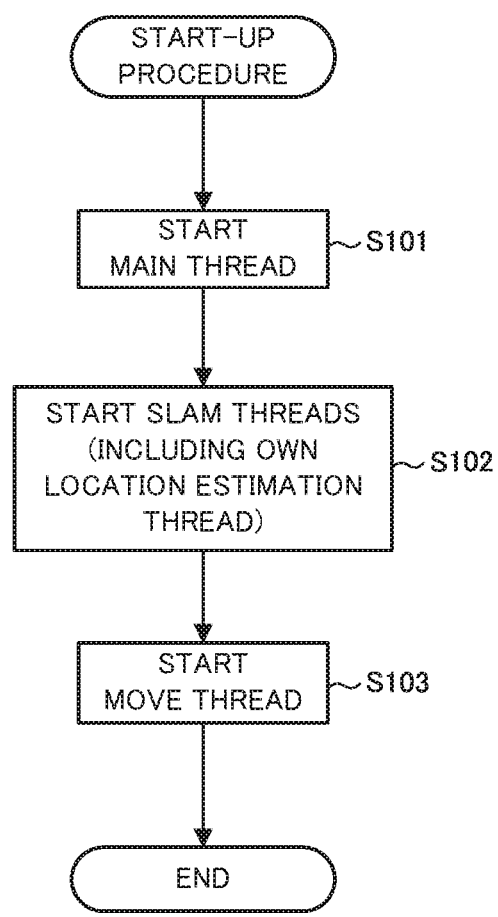
FIG. 6 is a flowchart of the start-up procedure of the autonomous mobile apparatus according to Embodiment 1.

The functional configuration of the autonomous mobile apparatus 100 is described above. Next, various procedures that are started by the autonomous mobile apparatus 100 will be described. During power-off, the autonomous mobile apparatus 100 is connected to the charger 200 and charged. Upon power-on, the start-up procedure that is described later is executed at the location where the autonomous mobile apparatus 100 is connected to the charger 200 and various threads including the main thread are executed in parallel. Here, the main thread is a thread for the autonomous mobile apparatus 100 to execute a procedure that corresponds to the purpose of use and, for example, a thread for executing an indoor cleaning procedure. Now, the start-up procedure of the autonomous mobile apparatus 100 is described with reference to FIG. 6. FIG. 6 is a flowchart of the start-up procedure of the autonomous mobile apparatus 100.

First, the controller 10 of the autonomous mobile apparatus 100 starts the main thread (Step S101). The main thread is a thread for performing a procedure that corresponds to the purpose of use (for example, an indoor cleaning procedure), in response to reception of information of the current posture (the 3D coordinates and the orientation within the environment map) of the autonomous mobile apparatus 100 from an own location estimation thread that is started in the next step.

Next, the controller 10 starts various threads for the SLAM (Step S102). The various threads for the SLAM mean an own location estimation thread for estimating the location of the autonomous mobile apparatus 100, a map creation thread for creating an environment map, a loop closing thread for performing a loop closing procedure, and the like. Here, the loop closing procedure means a procedure that is executed when the autonomous mobile apparatus 100 recognizes its returning to the same location as before to correct the key frame on the moving trajectory up to the present since the previous visit and related MapPoint 3D locations using the difference in value between the posture when the autonomous mobile apparatus 100 was at this same location before and the current posture.

Next, the controller 10 starts the move thread (Step S103). The move thread is a thread for performing, in response to reception of a move order from the main thread, a procedure that causes the move controller 15 to control the drivers 32 to move the autonomous mobile apparatus 100. Then, from then on, the autonomous mobile apparatus 100 is controlled by the threads that are started by this start-up procedure.

Figure 7:
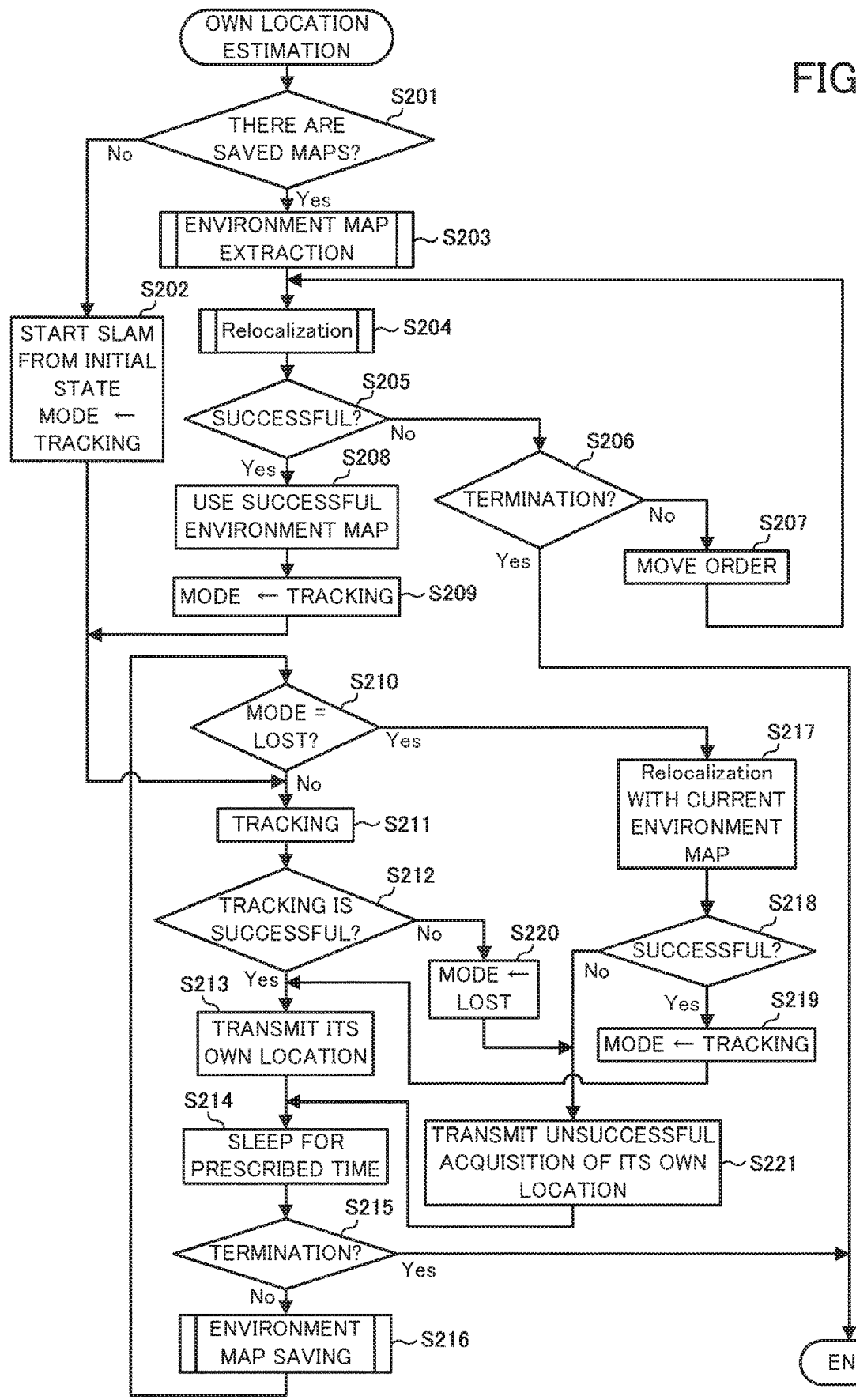
FIG. 7 is a flowchart of the own location estimation thread of the autonomous mobile apparatus according to Embodiment 1.

Among the threads for the SLAM, the own location estimation thread will be described with reference to FIG. 7. The own location estimation thread is a thread for selecting an environment map that is suitable for the current environment among the environment maps that are saved in the map saver 22 and performing a tracking procedure (an own location estimation procedure) using the selected environment map.

First, the controller 10 determines whether environment maps are saved in the map saver 22 (Step S201). If no environment map is saved in the map saver 22 (Step S201; No), the controller 10 starts the SLAM from the initial state, sets a variable MODE to TRACKING (Step S202), and proceeds to Step S211. Here, the variable MODE is a variable that presents whether the autonomous mobile apparatus 100 is currently in a state of being able to estimate its own location (in the state TRACKING) or in a state of being unable to estimate its own location (in the state LOST).

If environment maps are saved in the map saver 22 (Step S201; Yes), the controller 10 performs an environment map extraction procedure that is a procedure to extract, from among the environment maps that are saved in the map saver 22, an environment map that is highly possibly suitable for the current environment (Step S203). Details of the environment map extraction procedure will be described later.

Then, the controller 10 performs a relocalization procedure that is a procedure to estimate its own location using an environment map when the current own location is unknown (Step S204). Details of the relocalization procedure will be described later.

Then, the controller 10 determines whether the relocalization procedure was successful (Step S205). If the relocalization procedure was unsuccessful (Step S205; No), the controller 10 determines whether there is a termination order from the main thread or the user (Step S206). If there is a termination order (Step S206; Yes), the own location estimation thread ends. If there is no termination order (Step S206; No), a move order is issued to the move thread to move (Step S207) and the processing returns to Step S204 to perform the relocalization procedure again. Here, the move in Step S207 is a move for changing an image that is acquired first in the relocalization procedure. If the autonomous mobile apparatus 100 moves, for example, in the processing of another thread that is in parallel operation, there is no need to move again in Step S207.

On the other hand, if the relocalization procedure was successful (Step S205; Yes), the controller 10 reads into the map storage 21 as the estimation environment map and uses in the subsequent own location estimation the environment map that was selected during the successful relocalization procedure (Step S208). Then, the controller 10 sets the variable MODE to TRACKING (Step S209) and proceeds to Step S211.

In Step S211, its own location is estimated in the tracking procedure by the SLAM. This tracking procedure, first, extracts feature points from image data that are captured by the imager 33 and acquires, using the feature quantities, a correspondence between the extracted feature points and feature points for which the 3D coordinates are already estimated in a key frame included in the environment map (the estimation environment map). If the number of feature points with the correspondence acquired (the corresponding feature points) is equal to or higher than a reference trackable number (for example, 10), the controller 10 can estimate its own location from the relationship between the 2D coordinates of the corresponding feature points in the image and the 3D coordinates within the environment map. In such a case, the tracking is successful. If the number of corresponding feature points is lower than the reference trackable number, estimation of its own location leads to a large error and the controller 10 determines that the tracking is unsuccessful and does not estimate its own location.

The controller 10 determines whether the tracking procedure was successful after the tracking procedure (Step S212). If the tracking procedure was successful (Step S212; Yes), the controller 10 transmits its own location that is acquired in the tracking procedure to the main thread (Step S213). Then, the controller 10 sleeps for a prescribed time (for example, 10 seconds) (Step S214).

On the other hand, if the tracking procedure was unsuccessful (Step S212; No), the controller 10 sets the variable MODE to LOST (Step S220), transmits to the main thread unsuccessful acquisition of its own location (Step S221), and proceeds to Step S214 to sleep for a prescribed time.

Subsequently, the controller 10 determines whether there is a termination order from the main thread or the user (Step S215). If there is a termination order (Step S215; Yes), the own location estimation thread ends. If there is no termination order (Step S215; No), an environment map saving procedure that is a procedure to save an environment map is performed (Step S216). Details of the environment map saving procedure will be described later.

Next, the controller 10 determines whether the value that is set in the variable MODE is LOST (Step S210). If the value that is set in the variable MODE is not LOST (Step S210; No), this means in the middle of TRACKING and the processing proceeds to Step S211 to perform the tracking procedure.

If the value that is set in the variable MODE is LOST (Step S210; Yes), the controller 10 performs the relocalization procedure using the environment map (the estimation environment map) that is currently in use (that is read into the map storage 21) (Step S217), and determines whether that relocalization procedure was successful (Step S218). If the relocalization procedure was successful (Step S218; Yes), the controller 10 sets the variable MODE to TRACKING (Step S219) and proceeds to Step S213. If the relocalization procedure was unsuccessful (Step S218; No), the controller 10 proceeds to Step S221.

The own location estimation thread is described above. Next, the environment map saving procedure that is executed in Step S216 of the own location estimation thread (FIG. 7) will be described with reference to FIG. 8. This procedure is a procedure to save in the map saver 22 a map (an estimation environment map) that is stored in the map storage 21 in every given time (for example, one hour).

First, the controller 10 determines whether a predetermined time (for example, one hour) has elapsed since the environment map was saved in the map saver 22 last time (Step S301). If the predetermined time has not elapsed (Step S301; No), the environment map saving procedure ends. If the predetermined time has elapsed (Step S301; Yes), the controller 10 captures an image with the imager 33 (Step S302). Then, the controller 10 counts the number of regions in the image where the luminance is high to acquire the number of lights that are on (Step S303). Here, the regions in an image where the luminance is high are specifically the regions that have a luminance that is equal to or higher than a predetermined reference luminance value. Since the imager 33 comprises a wide-angle lens that allows for photographing in a wide range between the forward and upward fields of the autonomous mobile apparatus 100, the ceiling is included in the imaging range and an image that makes it possible to determine the number of lights on the ceiling can be captured. In Step S303, the controller 10 functions as the environment information acquirer 11.

Then, the controller 10 writes in the map storage 21 the acquired number of lights that are on as environment information (Step S304). Then, the controller 10 saves in the map saver 22 the environment map (the environment map to which the environment information is added as shown in FIG. 5) that is stored in the map storage 21 (Step S305).

Through the environment map saving procedure described above, data of an environment map to which environment information is added is saved in the map saver 22 in every given time. Next, the environment map extraction procedure that is executed in Step S203 of the own location estimation thread (FIG. 7) will be described with reference to FIG. 9. This procedure is a procedure to extract, from among multiple environment maps that are saved in the map saver 22, an environment map that includes environment information that is identical or similar to the current environment information.

First, the controller 10 captures an image with the imager 33 (Step S401). Then, the controller 10 obtains the number of regions in the image where the luminance is high (the regions that have a luminance that is equal to or higher than the predetermined reference luminance value) to detect the number of lights that are on (Step S402).

Then, the controller 10 extracts, from among multiple environment maps that are saved in the map saver 22, a predetermined number (N) of candidate environment maps that are the same or similar in the environment information (the number of lights that are on) (Step S403) and ends the environment map extraction procedure. For extracting the environment maps, N environment maps are extracted in the order of similarity of the environment information that is added to the environment map to the current environment information. The N extracted environment maps are candidates for an environment map of future use and thus called candidate environment maps. Here, N can be any number, for example 5 or so; however, only less than N candidate environment maps may be extracted when a small number of environment maps are saved in the map saver 22.

Figure 10:
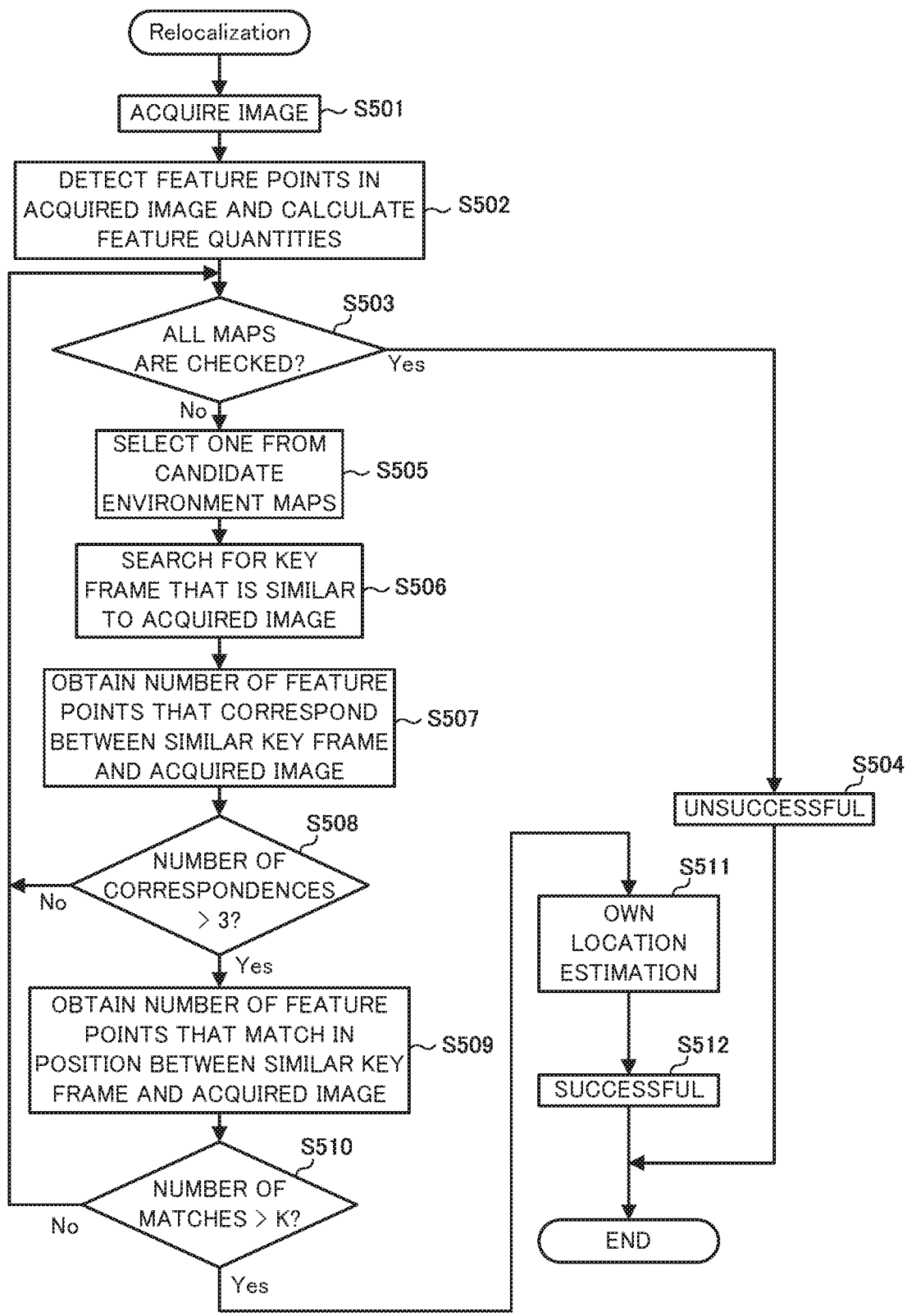
FIG. 10 is a flowchart of the relocalization procedure of the autonomous mobile apparatus according to Embodiment 1.

Through the environment map extraction procedure described above, N candidate environment maps having the environment information that is identical or similar to the current environment information are extracted from among multiple environment maps that are saved in the map saver 22. Next, the relocalization procedure that is executed in Step S204 of the own location estimation thread (FIG. 7) will be described with reference to FIG. 10.

First, the controller 10 captures an image with the imager 33 (Step S501). Then, the controller 10 detects feature points in the image and calculates feature quantities of the detected feature points (Step S502). Any method of detecting feature points and any feature quantity can be used. For example, it is possible to use the FAST as the detection method and the ORB as the feature quantity.

Next, the controller 10 determines whether a correspondence between the detected feature points and feature points for which the 3D coordinates are already estimated in a similar key frame that is found in Step S506 later described is checked for all of the N candidate environment maps that are extracted in the environment map extraction procedure that is executed earlier (Step S503). If the correspondence between the feature points is checked for all candidate environment maps (Step S503; Yes), it is assumed that the relocalization procedure was unsuccessful (Step S504) and the relocalization procedure ends.

If there are still remaining candidate environment maps for which correspondence between feature points is not checked (Step S503; No), the controller 10 selects one of the remaining candidate environment maps (Step S505). Then, the controller 10 searches for a key frame that is similar to the image that is acquired in Step S501 (the acquired image) in the set of key frame information of the selected candidate environment map (Step S506). Any method of searching for a similar key frame can be used. For example, high speed search is possible by classifying all key frames within the selected candidate environment map by a histogram of feature quantities, which is followed by similarity search using the similarity between the histogram of feature quantities of the acquired image and the histogram.

Then, the controller 10 finds, using the feature quantities, correspondence between the feature points for which the 3D coordinates are already estimated in the similar key frame that is found in Step S506 and the feature points in the acquired image that is acquired in Step S501. For example, when the similarity between the feature quantity of a feature point (for which the 3D coordinates are already estimated) within a similar key frame and the feature quantity of a feature point within the acquired image is higher than a predetermined reference similarity, these two feature points are assumed to be feature points that correspond to each other (the corresponding feature points). Then, the number of such corresponding feature points is obtained (Step S507).

Then, the controller 10 determines whether the number of corresponding feature points is greater than 3 (Step S508). If the number of corresponding feature points is equal to or less than 3 (Step S508; No), the processing returns to Step S503. Here, before returning to Step S503, the processing may return to Step S506 and search for a similar key frame that was not found last time (namely, the similarity is the second highest or lower) among the key frames that are similar to the image that is acquired in Step S501. This is because the number of corresponding feature points may be high in some cases even if the similarity is not high. The processing returns to Step S506 to obtain the number of corresponding feature points in another similar key frame a predetermined number of times (for example, three times)

and if the number of the corresponding feature points is equal to or less than 3 (Step S508; No), the processing returns to Step S503.

On the other hand, if the number of corresponding feature points is greater than 3 (Step S508; Yes), the processing proceeds to Step S509. If four or more feature points among the feature points within the acquired image correspond to feature points (for which the 3D coordinates are already estimated) within a similar key frame, it is possible to estimate the posture (the location and the orientation) of the autonomous mobile apparatus 100 at the time of acquisition of the acquired image as a perspective-n-point problem (PnP problem).

In Step S509, the controller 10 solves the PnP problem to estimate the posture of the autonomous mobile apparatus 100. Using the estimated posture, the controller 10 calculates the error (a correspondence error) between the 2D coordinates of a feature point within the similar key frame and the 2D coordinates of a feature point within the acquired image that corresponds in feature quantity to the feature point within the similar key frame, that is, has a feature quantity similar thereto. Here, whether the 3D coordinates are already estimated is not a matter for this correspondence. Then, if the correspondence error is equal to or smaller than a reference error T, the controller 10 assumes that the locations of the feature points match and obtains the number of such matching, corresponding feature points (the number of matches) (Step S509).

Then, the controller 10 determines whether the number of matches is greater than a reference match number K (for example, 10) (Step S510). If the number of matches is equal to or less than the reference match number K (Step S510; No), the processing returns to Step S503. If the number of matches is greater than the reference match number K (Step S510; Yes), the controller 10 adds the posture that is estimated in Step S509 to the 3D posture in the similar key frame to estimate its own location (Step S511). Then, it is assumed that the relocalization procedure was successful (Step S512) and the relocalization procedure ends.

Through the relocalization procedure described above, the autonomous mobile apparatus 100 can select an environment map that allows for correct estimation of its own location. Here, in the procedure of FIG. 10, among the candidate environment maps, the first environment map with the number of matches greater than K is eventually selected. However, it may be possible to obtain the number of matches for all candidate environment maps and eventually select an environment map that has the highest number of matches, or to also store the error in coordinate positions of feature points while obtaining the number of matches and eventually select an environment map that has the smallest error.

Through the own location estimation thread described above, the autonomous mobile apparatus 100 can select as an estimation environment map an environment map that is most suitable for the start-up environment and thus can perform robust estimation of its own location over environment change.

Modified Embodiment 1 of Embodiment 1

In Embodiment 1, only the number of lights that are on is used as the environment information. Simply using the number of lights as the environment information can improve the robustness over environment change in comparison to the prior art in which a single environment map is continuously used. However, other information may be used for further improving the robustness. For example, as Modified Embodiment 1 of Embodiment 1, a case in which information of the ceiling light being ON/OFF and information of the brightness of the surrounding environment are used as the environment information will be described.

In Embodiment 1, only the number of lights that are on is used as the environment information. On the other hand, in Modified Embodiment 1 of Embodiment 1, information of the light being ON/OFF and information of the brightness of the surrounding environment are used as the environment information; therefore, the environment information is expressed by a two-dimensional vector (the ceiling light being ON or OFF, the brightness of the surrounding environment). In Embodiment 1, the number of lights that are on is used as the environment information as it is in the environment map saving procedure (FIG. 8) and the environment map extraction procedure (FIG. 9). In Modified Embodiment 1 of Embodiment 1, in each procedure, a two-dimensional vector (the ceiling light being ON or OFF, the brightness of the surrounding environment) is generated as the environment information.

Here, whether the ceiling light is ON/OFF is determined by determining whether there is a region where the luminance is extremely higher than the surroundings in the region that corresponds to the top part of the imaging range in the image that is captured by the imager 33. For example, if there is a region where the luminance is a reference high luminance value (for example, 10) or more times as high as the average luminance of the entire image in the upper half region of the captured image, it is determined that the ceiling light is on.

Moreover, in regard to information of the brightness of the surrounding environment, for obtaining this information, the autonomous mobile apparatus 100 may additionally comprise a brightness sensor or alternatively acquire the brightness of the surrounding environment with the imager 33. For example, it may be possible to set the exposure time of the imager 33 to a value for measuring the brightness, acquire an image of the room where the autonomous mobile apparatus 100 is present, and use the average value or the median value of all pixel values of the image as the brightness of the surrounding environment.

The first value of the two-dimensional vector of the environment information (the ceiling light is ON or OFF) is a binary value, which is 1 if the light is ON and 0 if the light is OFF. The second value of the two-dimensional vector of the environment information (the brightness of the surrounding environment) is the average value or the median value of the pixel values as described above. Then, in the above-described environment map saving procedure, the environment information of such a two-dimensional vector is added to the environment map and saved. Moreover, in the environment map extraction procedure, the similarity between the two-dimensional vector of the environment information that is obtained by capturing an image and the two-dimensional vector of the environment information that is added to each of the environment maps that are saved in the map saver 22 is obtained and N candidate environment maps are extracted in the descending order of the similarity. Here, the similarity between the two-dimensional vectors can be obtained by normalizing the norm of each vector to 1 and calculating the inner product.

In the above-described Modified Embodiment 1 of Embodiment 1, change in the brightness of the surroundings is reflected in the environment information and therefore it is possible to accommodate not only influence of the light being ON/OFF but also influence of change in the sunlight entering through the windows depending on the position of the sun and influence of the blinds being opened or closed. Therefore, it is possible to select, as an estimation environment map from among the environment maps that are saved in the map saver 22, an environment map that is more suitable for the current environment and thus perform more robust estimation of its own location over environment change.

Here, more varieties of information, if used as the environment information, can be accommodated by increasing the number of dimensions of the vector that presents the environment information. Moreover, if the number of dimensions of the vector is increased, the similarity of the environment information can be obtained by normalizing the norms of the two target vectors to calculate their similarity to 1 and obtaining the inner product. Increasing the number of dimensions of the vector that presents the environment information makes it possible to increase the possibility of selecting, as an estimation environment map from among the environment maps that are saved in the map saver 22, an environment map that is further suitable for the current environment and thus perform further robust estimation of its own location over environment change. Here, in the above-described Modified Embodiment 1 of Embodiment 1, a case in which the environment information is expressed by a vector such as a two-dimensional vector is described. However, the environment information is not necessarily expressed by a vector and any data structure can be adopted.

Modified Embodiment 2 of Embodiment 1

In the above-described embodiment, the environment map that is in use is not changed even if the relocalization procedure in Step S217 of the own location estimation thread (FIG. 7) is unsuccessful. However, it is envisioned that environment such as the brightness of the surroundings may change with time when, for example, the autonomous mobile apparatus 100 keeps moving for a prolonged time. Modified Embodiment 2 of Embodiment 1 in which the environment map to use (an estimation environment map) can be changed as necessary in such a case will be described.

Figure 11:
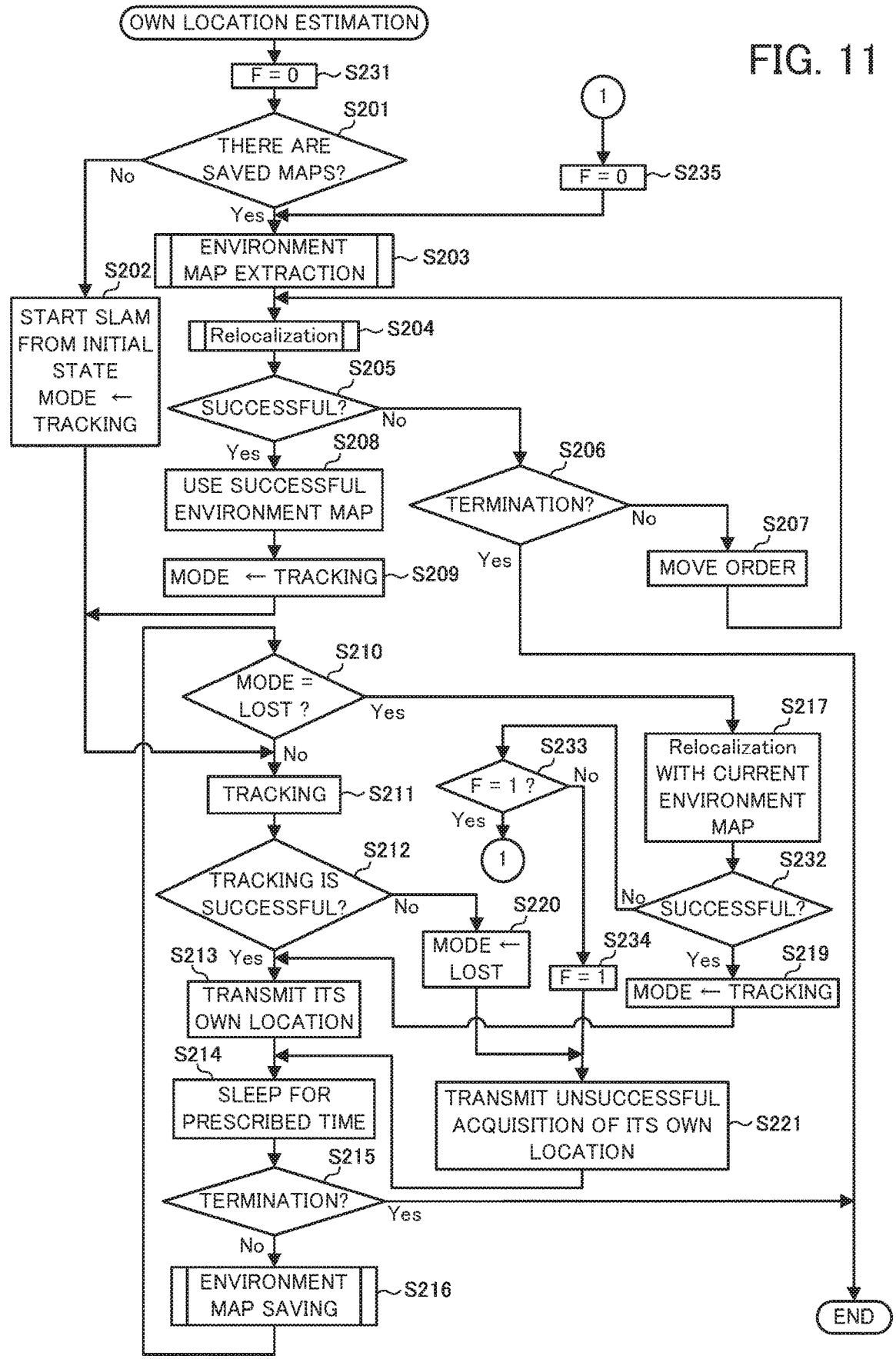
FIG. 11 is a flowchart of the own location estimation thread of the autonomous mobile apparatus according to Modified Embodiment 2 of Embodiment 1 of the present disclosure.

In the own location estimation thread according to Modified Embodiment 2 of Embodiment 1, as shown in FIG. 11, the processing in Step S231 and Steps S233 through S235 is added to the own location estimation thread according to Embodiment 1 (FIG. 7) and the processing in Step S218 is replaced with the processing in Step S232. The other processing of Modified Embodiment 2 of Embodiment 1 is the same as in Embodiment 1. The added processing is processing for introducing a flag variable F for determining whether the "relocalization with the current environment map" in Step S217 was unsuccessful two times in a row and starting over from Step S203 if unsuccessful two times in a row.

First, in Step S231, the controller 10 initializes the flag variable F to 0. Then, in Step S232, if the relocalization procedure in Step S217 was successful (Step S232; Yes), the processing proceeds to Step S219 as in Step S218. However, if the relocalization procedure was unsuccessful (Step S232; No), the controller 10 determines whether the flag variable F is 1 (Step S233).

If the flag variable F is not 1 (Step S233; No), the controller 10 sets the flag variable F to 1 (Step S234) and proceeds to Step S221. If the flag variable F is 1 (Step S233; Yes), the controller 10 initializes the flag variable F to 0 (Step S235) and returns to Step S203 to start over from the environment map extraction. The processing other than the above described processing is the same as in the own location estimation thread according to Embodiment 1 (FIG. 7) and its explanation is omitted.

Through the above-described own location estimation thread, if the relocalization with the environment map (the estimation environment map) that is currently in use is unsuccessful two times in a row, the processing starts over from the extraction of candidate environment maps and an environment map to which environment information that is identical or similar to the environment information at that time is added is selected from among the multiple environment maps that are saved in the map saver 22. Therefore, even if the environment changes, it is possible to reselect an environment map that is suitable for the environment at that time as the estimation environment map and thus perform more robust estimation of its own location over environment change.

Modified Embodiment 3 of Embodiment 1

In the above-described embodiment, the imager 33 that is provided to the autonomous mobile apparatus 100 is used as means for acquiring the environment information. Modified Embodiment 3 of Embodiment 1 in which the charger's imager 53 that is provided to the charger 200 is used as the means for acquiring the environment information will be described.

For acquiring the state of the light being on/off, the brightness of the surrounding environment, and the like, the autonomous mobile apparatus 100 according to Modified Embodiment 3 of Embodiment 1 issues an imaging order to the charger 200 via the communicator 34 and receives an image that is captured by the charger's imager 53 that is provided to the charger 200 via the communicator 34. Here, although not shown, the charger 200 also comprises a communicator that is communicable with the communicator 34 of the autonomous mobile apparatus 100. The autonomous mobile apparatus 100 according to Modified Embodiment 3 of Embodiment 1 is the same as the autonomous mobile apparatus 100 according to Embodiment 1 except that an image for acquiring the environment information is captured by the charger's imager 53 in place of the imager 33. Here, instead of always using the charger's imager 53 for capturing an image for acquiring the environment information, it may be possible to use either the imager 33 or the charger's imager 53 as appropriate or always use both the imager 33 and the charger's imager 53.

In the above described Modified Embodiment 3 of Embodiment 1, an image for acquiring the environment information is captured by the charger's imager 53 of the charger 200. The charger 200 does not move. Therefore, the charger's imager 53 can capture an image at a predetermined fixed location. Therefore, in comparison of using the imager 33 that moves with the autonomous mobile apparatus 100, the environment information can be acquired in a more stable manner. Therefore, it is possible to select as an estimation environment map an environment map that is more suitable for the current environment based on this more stable environment information and thus perform more robust estimation of its own location over environment change.

Modified Embodiment 4 of Embodiment 1

In the above described Modified Embodiment 3 of Embodiment 1, the charger 200 has to comprise the charger's imager 53 and a communicator. Modified Embodiment 4 of Embodiment 1 in which the same effect is obtained using the imager 33 of the autonomous mobile apparatus 100 will be described.

The autonomous mobile apparatus 100 according to Modified Embodiment 4 of Embodiment 1 is charged on the charger 200 while powered OFF. Then, the autonomous mobile apparatus 100 is located on the charger 200 immediately after powered on. Therefore, an image that is captured by the imager 33 immediately after powered on can be treated as the same image that is captured by the charger's imager 53 that is fixed to the charger 200 according to Modified Embodiment 3. Then, in the environment map saving procedure that is executed in the own location estimation thread according to Modified Embodiment 4 of Embodiment 1, the processing of saving in the map saver 22 an environment map to which the environment information is added is performed when the autonomous mobile apparatus 100 returns to the charger 200, not each time a predetermined time has elapsed.

The autonomous mobile apparatus 100 according to the above-described Modified Embodiment 4 of Embodiment 1 always captures an image for acquiring the environment information on the charger 200 and thus can acquire change in the environment information in a more stable manner as in Modified Embodiment 3 of Embodiment 1. Therefore, it is possible to select as an estimation environment map an environment map that is more suitable for the current environment based on this more stable environment information and thus perform more robust estimation of its own location over environment change.

Modified Embodiment 5 of Embodiment 1

In the above-described embodiments, the autonomous mobile apparatus 100 captures an image of the surrounding environment for acquiring the environment information with the imager 33 (or the charger's imager 53) and extracts, as candidate environment maps, environment maps to which environment information that is similar to the environment information that is acquired through the imaging is added in the environment map extraction procedure (FIG. 9). However, the user may select candidate environment maps. Modified Embodiment 5 of Embodiment 1 in which the user can select candidate environment maps will be described.

In Modified Embodiment 5 of Embodiment 1, the controller 10 does not need to acquire environment information by capturing an image in the environment map extraction procedure (FIG. 9) and instead, extracts, as candidate environment maps, environment maps that are selected by the user. In doing so, the user selects, from an external terminal apparatus or the like via the communicator 34, any number (for example, N) of environment maps he wishes to select from among the environment maps that are saved in the map saver 22. Then, the controller 10 performs the relocalization procedure (FIG. 10) using the candidate environment maps that are selected by the user.

In order for the user to easily select the environment maps, the external terminal apparatus that is used for selecting the environment maps may present the meanings of the environment information that is added to each environment map in an easily-understandable manner. For example, for each environment map, environment information "Date of saving: Mar. 1, 2018, 10:00, Number of lights that are on; 1, Brightness: 1000 lux" may be displayed so that the user can select environment maps.

In the above-described Modified Embodiment 5 of Embodiment 1, the user can select candidate environment maps from among the environment maps that are saved in the map saver 22. Therefore, the user himself can select environment maps that are more suitable for the current environment even in a special case in which it is difficult to successfully extract environment maps that are suitable for the current environment through extraction by the similarity of the environment information, and thus it is possible to perform more robust estimation of its own location over environment change. Here, the autonomous mobile apparatus 100 may comprise a microphone and voice recognition function and acquire environment maps that are selected by the user through voice recognition. Moreover, instead of all candidate environment maps being selected by the user, it may be possible that some of candidate environment maps are selected by the user and the other candidate environment maps are selected by the controller 10 based on the similarity of the environment information.

Modified Embodiment 6 of Embodiment 1

Figure 8:
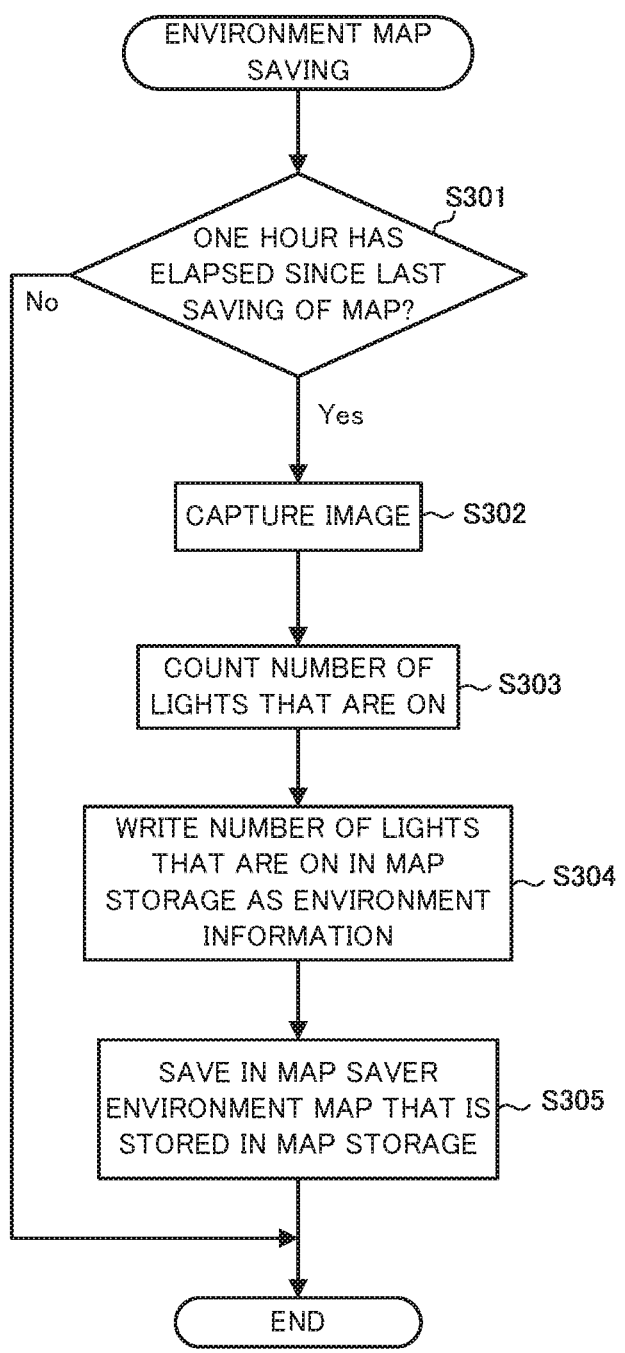
FIG. 8 is a flowchart of the environment map saving procedure of the autonomous mobile apparatus according to Embodiment 1.
Figure 9:
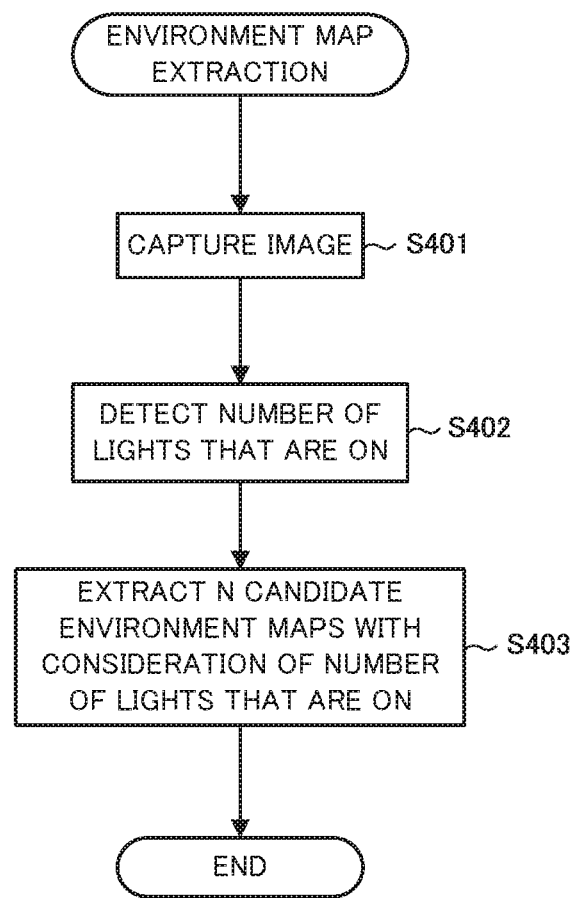
FIG. 9 is a flowchart of the environment map extraction procedure of the autonomous mobile apparatus according to Embodiment 1.

In the above-described embodiments, the autonomous mobile apparatus 100 captures an image of the surrounding environment for acquiring the environment information with the imager 33 (or the charger's imager 53) and saves in the map saver 22 an environment map to which the environment information that is acquired through the imaging is added in the environment map saving procedure (FIG. 8). However, the environment information that is added in saving an environment map may be entered by the user. Modified Embodiment 6 of Embodiment 1 in which the user can enter environment information that is added to an environment map will be described.

In Modified Embodiment 6 of Embodiment 1, the controller 10 does not need to acquire environment information by capturing an image and saves an environment map along with environment information that is entered by the user in the environment map saving procedure (FIG. 8). In doing so, the user enters any environment information he wishes to add to an environment map that is created by the autonomous mobile apparatus 100 by then into the autonomous mobile apparatus 100 from an external terminal apparatus or the like via the communicator 34. At this point, the communicator 34 functions as an input device that acquires information that is entered by the user. Then, the controller 10 saves in the map saver 22 an environment map to which the environment information that is entered by the user is added.

In the above-described Modified Embodiment 6 of Embodiment 1, the user can enter environment information into the autonomous mobile apparatus 100. Therefore, the user himself can enter environment information that properly presents the current environment into the autonomous mobile apparatus 100 even in a special case in which environment information cannot properly be acquired. Consequently, it is easier to extract environment maps that are suitable for the current environment in extracting candidate environment maps, and thus it is possible to perform more robust estimation of its own location over environment change. Here, the autonomous mobile apparatus 100 may comprise a microphone and voice recognition function and acquire environment information that is entered by the user through voice recognition. In such a case, the microphone functions as the input device.

Moreover, instead of the user entering environment information to add to an environment map for all environment maps, it may be possible to add environment information that is entered by the user to an environment map only when the user thinks that it is difficult for the controller 10 to acquire proper environment information and wishes to enter environment information and, otherwise, add to an environment map environment information that is acquired by the environment information acquirer 11 such as by capturing an image.

Modified Embodiment 7 of Embodiment 1

In the above-described embodiment, the environment maps to which environment information that is identical or similar to the current environment information is added are extracted as candidate environment maps in the environment map extraction procedure (FIG. 9). Modified Embodiment 7 of Embodiment 1 in which a randomly selected environment map is extracted as a candidate environment map will be described.

In Modified Embodiment 7 of Embodiment 1, an environment map that is randomly selected from among the environment maps that are saved in the map saver 22 is added to the candidate environment maps. For example, for extracting N candidate environment maps, N-1 environment maps are extracted in the order of identicality or similarity to the current environment information and, for the last one, an environment map is randomly selected from among the environment maps that are saved in the map saver 22 and has not yet been extracted and added to the candidate environment maps.

In the above-described Modified Embodiment 7 of Embodiment 1, an environment map that is randomly selected under no influence of the environment information is included in the candidate environment maps. Therefore, it is possible to improve the possibility of an environment map that is suitable for the current environment being selected as the estimation environment map even in a special case in which an environment map that is suitable for the current environment cannot be extracted based on the similarity of the environment information, and thus perform more robust estimation of its own location over environment change. Here, the number of randomly selected environment maps is not restricted to one and can be any number equal to or lower than N such as 2 or N.

Moreover, the above-described embodiment and modified embodiments can be combined as appropriate. For example, the combination of Modified Embodiments 5 and 7 of Embodiment 1 makes it possible to include an environment map that is selected by the user and a randomly selected environment map in the candidate environment maps other than the candidate environment maps that are extracted by the controller 10 based on the similarity of the environment information. In this way, it is possible to further increase the possibility of an environment map that is more suitable for the current environment being selected even in a special case in which an environment map that is suitable for the current environment cannot be extracted through extraction based on the similarity of the environment information, and thus perform more robust estimation of its own location over environment change.

Here, the above embodiments are described on the assumption that the autonomous mobile apparatus 100 creates maps by the SLAM and periodically saves in the map saver 22 an environment map that includes environment information in the environment map saving procedure (FIG. 8). However, it is not essential to create and save maps. When environment maps that are created under various kinds of environment information are saved in the map saver 22 beforehand, the autonomous mobile apparatus 100 can perform estimation of its own location by selecting from among the environment maps that are saved in the map saver 22 and using an environment map that is suitable for the current environment without creating maps.

Moreover, the above embodiments are described on the assumption that, as shown in FIG. 5, an environment map corresponds to a piece of environment information (each environment map is an environment map that includes the piece of environment information). In such a case, environment maps as many as the number of kinds of environment information are created. However, the correspondence between environment information and environment maps is not restricted thereto. For example, it may be possible that the autonomous mobile apparatus 100 creates a single environment map and environment information is included in each feature point information that is included in the environment map, thereby configuring a single environment map that can accommodate multiple environments. In such a case, upon acquisition of each feature point information, environment information at that time is also acquired and an environment map that includes the environment information in the feature point information is created. Moreover, for using the environment map, the feature point information that includes environment information that is closest to the current environment is used. Such a modified embodiment is also included in the present disclosure.

Here, the functions of the autonomous mobile apparatus 100 can also be implemented by a computer such as a conventional personal computer (PC). Specifically, the above embodiments are described on the assumption that the program for the autonomous move control procedure that is performed by the autonomous mobile apparatus 100 is prestored on the ROM of the memory 20. However, the program may be saved and distributed on a non-transitory computer-readable recording medium such as a flexible disc, a compact disc read only memory (CD-ROM), a digital versatile disc (DVD), and a magneto-optical disc (MO), and read and installed on a computer to configure a computer that can realize the above-described functions.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. An autonomous mobile apparatus, comprising:
a camera;
a driver; and
a processor, wherein
the processor is configured to
  acquire, based on an image that is acquired by the camera, on/off information and brightness information, the on/off information indicating whether a light is on or off, the brightness information being information of brightness of a surrounding environment of the autonomous mobile apparatus,
  select, from among environment maps that each are saved in a memory in association with environment information relating to brightness, as an estimation environment map, an environment map that is associated with environment information suitable for a two-dimensional vector, the two-dimensional vector being generated based on the acquired on/off information and the acquired brightness information, estimate a location of the autonomous mobile apparatus using the selected estimation environment map and an image of surroundings of the autonomous mobile apparatus that is acquired by the camera, control the driver to move the autonomous mobile apparatus from the estimated location to a predetermined destination, wherein for selecting the estimation environment map, the processor is further configured to:

extract, as candidate environment maps from among the environment maps that are saved in the memory, multiple environment maps to which environment information that satisfies a predetermined condition with respect to similarity to the two-dimensional vector generated based on current on/off information and current brightness information is added, and select as the estimation environment map one of the candidate environment maps having an error in the location of the autonomous mobile apparatus that is equal to or smaller than a reference error, the error in the location being estimated using each of the multiple extracted candidate environment maps.

2. The autonomous mobile apparatus according to claim 1, wherein the processor is configured to create the environment map using the image of the surroundings of the autonomous mobile apparatus that is acquired by the camera in addition to the estimating of the location of the autonomous mobile apparatus; and save the created environment map in the memory in association with the on/off information and the brightness information that are acquired while the environment map is created.

3. The autonomous mobile apparatus according to claim 1, wherein the processor is configured to acquire the on/off information and the brightness information by capturing the image of the surroundings of the autonomous mobile apparatus with the camera.

4. The autonomous mobile apparatus according to claim 1, further comprising:

a communicator configured to communicate with a charger of the autonomous mobile apparatus, the charger including a charger imager, wherein the processor is configured to acquire the on/off information and the brightness information by receiving through the communicator an image of the surroundings of the autonomous mobile apparatus that is captured by the charger imager.

5. The autonomous mobile apparatus according to claim 1, wherein the processor is configured to acquire the on/off information and the brightness information by acquiring information that is entered by a user.

6. The autonomous mobile apparatus according to claim 1, wherein the processor is configured to, when an error in the location of the autonomous mobile apparatus that is estimated using the estimation environment map exceeds a reference error, reselect, as the estimation environment map from among the environment maps that are saved in the memory, an environment map that is suitable for the surrounding environment, and estimate the location of the autonomous mobile apparatus using the reselected estimation environment map.

7. The autonomous mobile apparatus according to claim 1, wherein a first value of the two-dimensional vector is a binary value that is 1 if the light is ON and 0 if the light is OFF.

8. The autonomous mobile apparatus according to claim 7, wherein a second value of the two-dimensional vector that is the brightness information is derived based on the image acquired by the camera.

9. The autonomous mobile apparatus according to claim 8, wherein the second value of the two-dimensional vector is an average value or a median value of pixel values of the image acquired by the camera.

10. The autonomous mobile apparatus according to claim 9, wherein similarity between a plurality of the two-dimensional vectors is obtained by normalizing a norm of each two-dimensional vector to 1 and calculating an inner product thereof.

11. The autonomous mobile apparatus according to claim 1, wherein a second value of the two-dimensional vector that is the brightness information is derived based on the image acquired by the camera.

12. The autonomous mobile apparatus according to claim 11, wherein the second value of the two-dimensional vector is an average value or a median value of pixel values of the image acquired by the camera.

13. The autonomous mobile apparatus according to claim 1, wherein similarity between a plurality of the two-dimensional vectors is obtained by normalizing a norm of each two-dimensional vector to 1 and calculating an inner product thereof.

14. A method performed in an autonomous mobile apparatus including a camera and a driver, the method comprising:

acquiring, based on an image that is acquired by the camera, on/off information and brightness information, the on/off information indicating whether a light is on or off, the brightness information being information of brightness of a surrounding environment of the autonomous mobile apparatus;

selecting, from among environment maps that each are saved in a memory in association with environment information relating to brightness, as an estimation environment map, an environment map that is associated with environment information suitable for a two-dimensional vector, the two-dimensional vector being generated based on the acquired on/off information and the acquired brightness information;

estimating a location of the autonomous mobile apparatus using the selected estimation environment map and an image of surroundings of the autonomous mobile apparatus that is acquired by the camera;

controlling the driver to move the autonomous mobile apparatus from the estimated location to a predetermined destinations;

wherein selecting the estimation environment map further includes:

extracting, as candidate environment maps from among the environment maps that are saved in the memory, multiple environment maps to which environment information that satisfies a predetermined condition with respect to similarity to the two-dimensional vector generated based on current on/off information and current brightness information is added; and selecting as the estimation environment map one of the candidate environment maps having an error in the location of the autonomous mobile apparatus that is equal to or smaller than a reference error, the error in the location being estimated using each of the multiple extracted candidate environment maps.

15. A non-transitory computer-readable recording medium that stores a program executable by a processor included in an autonomous mobile apparatus, the autonomous mobile apparatus including a camera and a driver, the program causing the processor to execute a process, the process comprising:

acquiring, based on an image that is acquired by the camera, on/off information and brightness information, the on/off information indicating whether a light is on or off, the brightness information being information of brightness of a surrounding environment of the autonomous mobile apparatus;

selecting, from among environment maps that each are saved in a memory in association with environment information relating to brightness, as an estimation environment map, an environment map that is associated with environment information suitable for a two-dimensional vector, the two-dimensional vector being generated based on the acquired on/off information and the acquired brightness information;

estimating a location of the autonomous mobile apparatus using the selected estimation environment map and an image of surroundings of the autonomous mobile apparatus that is acquired by the camera;

controlling the driver to move the autonomous mobile apparatus from the estimated location to a predetermined destination;

wherein for selecting the estimation environment map, the process further includes:

extracting, as the candidate environment maps from among the environment maps that are saved in the memory, multiple environment maps to which environment information that satisfies a predetermined condition with respect to similarity to the two-dimensional vector generated based on current on/off information and current brightness information is added; and selecting as the estimation environment map one of the candidate environment maps having an error in the location of the autonomous mobile apparatus that is equal to or smaller than a reference error, the error in the location being estimated using each of the multiple extracted candidate environment maps.

* * * * *

UNITED STATES PATENT AND TRADEMARK OFFICE
CERTIFICATE OF CORRECTION

| | |
|---|---|
| PATENT NO. | : 11,662,738 B2 |
| APPLICATION NO. | : 16/293271 |
| DATED | : May 30, 2023 |
| INVENTOR(S) | : Mitsuyasu Nakajima |

It is certified that error appears in the above-identified patent and that said Letters Patent is hereby corrected as shown below:

In the Claims

In Column 19, Claim 2, Lines 31-32, delete "estimating of the location" and insert -- estimating the location --, therefor.

In Column 20, Claim 14, Line 54, delete "destinations;" and insert -- destination; --, therefor.

Signed and Sealed this
Fifth Day of September, 2023

Katherine Kelly Vidal
*Director of the United States Patent and Trademark Office*